(12) United States Patent
Von Koenigsegg et al.

(10) Patent No.: US 12,305,715 B2
(45) Date of Patent: May 20, 2025

(54) WET CLUTCH VALVE ARRANGEMENT

(71) Applicant: KOENIGSEGG AUTOMOTIVE AB, Ängelholm (SE)

(72) Inventors: Christian Von Koenigsegg, Vejbystrand (SE); Dag Bölenius, Ängelholm (SE); Emil Langeland Larsen, Ängelholm (SE); Ruben Lend, Vejbystrand (SE)

(73) Assignee: KOENIGSEGG AUTOMOTIVE AB, Ängelholm (SE)

( * ) Notice: Subject to any disclaimer, the term of this patent is extended or adjusted under 35 U.S.C. 154(b) by 0 days.

(21) Appl. No.: 18/270,584

(22) PCT Filed: Jan. 6, 2022

(86) PCT No.: PCT/EP2022/050221
§ 371 (c)(1),
(2) Date: Jun. 30, 2023

(87) PCT Pub. No.: WO2022/148824
PCT Pub. Date: Jul. 14, 2022

(65) Prior Publication Data
US 2024/0068527 A1    Feb. 29, 2024

(30) Foreign Application Priority Data

Jan. 7, 2021 (EP) ..................... 21150530

(51) Int. Cl.
*F16D 25/12* (2006.01)
*F16D 25/0638* (2006.01)
(Continued)

(52) U.S. Cl.
CPC ......... *F16D 25/14* (2013.01); *F16D 25/0638* (2013.01); *F16D 43/284* (2013.01)

(58) Field of Classification Search
CPC ..... F16D 25/0638; F16D 25/14; F16D 43/284
See application file for complete search history.

(56) References Cited

U.S. PATENT DOCUMENTS 2,642,844 A * 6/1953 Flinn ................... F16D 25/0638
92/60
3,358,796 A * 12/1967 Hilpert .................. F16D 43/284
192/3.33
(Continued)

FOREIGN PATENT DOCUMENTS

CN    106949170 B      7/2017
CN    110107613 A  *   8/2019  ......... F16D 25/0638
(Continued)

OTHER PUBLICATIONS

International Search Report and Written Opinion dated Mar. 15, 2022 issued in corresponding PCT Application No. PCT/EP2022/050221.

*Primary Examiner* — Stacey A Fluhart
(74) *Attorney, Agent, or Firm* — Howard J. Klein; Shore IP Group, PLLC

(57) ABSTRACT

A wet clutch (10) for mounting on a shaft (12) having an internal shaft conduit (88) for a hydraulic fluid is provided. The wet clutch (10) comprises: a clutch hub (16) configured to be mounted on the shaft (12), a clutch basket (18) configured to be rotationally supported relative to shaft (12), and a clutch pack (20) operationally connecting the clutch hub (16) and the clutch basket (18). The wet clutch (10) further comprises: a front part (34) configured to be fixed relative to the shaft, an actuator (22) supported by the front part (34) and radially spaced apart from the shaft (12), wherein the actuator (22) is configured to operationally connected to the shaft conduit (88). The wet clutch (10) further comprises: one or more relief valves (102) connected to the actuator and configured to release the hydraulic fluid.

20 Claims, 5 Drawing Sheets

(51) Int. Cl.
*F16D 43/284* (2006.01)
*F16D 48/02* (2006.01)

(56) References Cited

U.S. PATENT DOCUMENTS

| | | | |
|---|---|---|---|
| 3,556,271 A * | 1/1971 | Hilpert | F16H 45/00 |
| | | | 192/3.33 |
| 3,974,743 A | 8/1976 | Ivey | |
| 4,271,951 A * | 6/1981 | Nishimura | F16D 25/0638 |
| | | | 192/85.28 |
| 4,308,940 A * | 1/1982 | Cadee | F16D 25/0638 |
| | | | 192/103 FA |
| 4,399,900 A | 8/1983 | Ballendux et al. | |
| 6,035,989 A * | 3/2000 | Matsuoka | F16H 45/02 |
| | | | 192/85.25 |
| 6,098,771 A | 8/2000 | Vu | |
| 2007/0137715 A1 | 6/2007 | Ichikawa | |

FOREIGN PATENT DOCUMENTS

| | | | |
|---|---|---|---|
| JP | S5999125 A | 6/1984 | |
| WO | WO2020/161334 A1 | 8/2020 | |

* cited by examiner

WET CLUTCH VALVE ARRANGEMENT

CROSS-REFERENCE TO RELATED APPLICATIONS

This application is a national phase entry, under 35 U.S.C. 371, of International Application No. PCT/EP2022/050221, filed Jan. 6, 2022, the disclosure of which is incorporated herein by reference in its entirety. International Application No. PCT/EP2022/050221 claims priority from European Application No. 21150530.0, filed Jan. 7, 2021.

TECHNICAL FIELD

The proposed technology generally relates to the field of wet clutches for road vehicles, and particularly to rapidly rotating multiple-plate wet clutches in high performance applications.

BACKGROUND

In some applications, the dimensions of a single plate clutch are too great and there is a need for a more compact clutch for transferring the required torque. This can be obtained by multiple-plate clutches, which allows for smaller diameters with a maintained total friction force. Multiple-plate clutches is a well-established technology. In road vehicles, they are typically found in motorcycles and high-performance cars. Multiple-plate clutches have several driving members interleaved with driven members, typically collected in a clutch pack. There is a need to further reduce the dimensions of clutches, or at least to maintain current dimensions, with improved efficiency.

The friction elements, or driving and driven members, of a dry clutch are not subjected to a cooling lubricating liquid and rely on mechanical friction to engage. In a wet clutch, the friction elements are typically immersed in a cooling and lubricating liquid allowing for a smoother performance and longer life.

In some applications, the viscous drag in the clutch pack of a wet clutch that is unengaged for a prolonged period may result in efficiency losses. Such wet clutches can be designed to engage, or close, only when actively activated. Thus, there is a need for a multiple-plate wet clutch that reduces the viscous drag when the clutch is disengaged.

A hydraulically operated wet clutch may self-activate due to an increased pressure column of the hydraulic fluid caused by the rotation of the wet clutch. This limits the rotational speed at which the wet clutches can operate, which is disadvantageous in some applications, for example in the gearboxes of high-performance cars. Thus, there is a need for a wet clutch that does not self-active at high rotational speeds.

SUMMARY

It is an object of the proposed technology to provide a technology preventing a rotationally induced self-activation of a wet clutch. It is also an object of the proposed technology to improve the efficiency and reduce the overall dimensions of multiple-plate wet clutches. It is a further object to improve the cooling of such clutches and to reduce the viscous drag when they are unengaged.

In a first aspect of the proposed technology, a wet clutch is provided for mounting on a shaft having an internal shaft conduit for a hydraulic fluid. The wet clutch comprises: a clutch hub configured to be mounted on the shaft, a clutch basket configured to be rotationally supported relative to shaft, and a clutch pack operationally connecting the clutch hub and the clutch basket. The wet clutch further comprises a front part, or collar, configured to be fixed relative to the shaft, an actuator, or prime mover, supported by the collar and radially spaced apart from the shaft, wherein the actuator is configured to receive hydraulic fluid from the internal shaft conduit, or the actuator is operationally connected to the shaft conduit. The wet clutch further comprises one or more relief valves connected to the actuator and configured to release the hydraulic fluid, or more specifically to release the hydraulic fluid to prevent a rotationally induced activation of the actuator, or the wet clutch.

The shaft may pass through the complete wet clutch. The actuator may be configured to activate, or engage the clutch pack, at an increase in pressure of the hydraulic fluid, or configured to be driven, or operated by, the hydraulic fluid. The relief valve may be configured to release the hydraulic fluid from the actuator, or for deactivating the actuator. The relief valve may be configured to release hydraulic fluid depending on the rotational speed of the shaft, or the rotational speed of the relief valves around the rotational axis of the shaft. The relief valves may be configured to release hydraulic fluid above a first rotationally induced, or built up, pressure in the hydraulic fluid. This pressure may be at the actuator. The first rotationally induced pressure may be a pressure at or below which the hydraulic fluid causes the actuator to engage the clutch pack. The relief valves may be configured to release hydraulic fluid above a first rotational speed of the of the shaft, or the relief valves, around the rotational axis of the shaft.

The fact that the actuator is radially spaced apart from the shaft and that it is operationally connected to the shaft conduit means that the rotation of the shaft will build up a pressure in the actuator. The relief valves have the effect that rotationally induced pressure of the hydraulic fluid at the actuator is reduced. The relief valves may even empty the hydraulic fluid from the actuator, and possibly also from the internal shaft conduit. The relief valves may be open at any rotationally induced pressure that activates the actuator. Preferably, they may open before reaching the pressure that activates the actuator.

The actuator may be biased away from the clutch pack. It may be spring biased or biased by one or more springs. Alternatively, or additionally, the actuator may be biased to disengage from the clutch pack, or it may be biased to be in an unengaged state. The pressure of the hydraulic fluid in the actuator may have to overcome the biasing for the actuator to engage the clutch pack, or to change the actuator to an engaged state, e.g. from an unengaged state.

The one or more relief valves may be positioned at the actuator. This ensures a release of the hydraulic fluid forming a pressure column at the actuator.

The one or more relief valves, and in extension the wet clutch, may be configured to release the hydraulic fluid to the surroundings, or to the outside, of the wet clutch. The surroundings of the wet clutch are understood to encompass the outside of the wet clutch. The wet clutch may comprise one or more inlet release conduits, each being configured to lead the hydraulic fluid from the actuator to a relief valve. The wet clutch may comprise one or more outlet release conduit, each being configured to lead the hydraulic fluid from a relief valve to the surroundings of the wet clutch. Each of the outlet release conduit may extend in a radial direction relative to the shaft. The inlet release conduits may have an inlet at the outer end of the piston, or at a radially distant portion of the piston with respect to the shaft.

Similarly, the outlet release conduits may have an outlet at the outer end of the piston, or at a radially distant portion of the piston with respect to the shaft.

The actuator may comprise: a recess formed by the front part and configured to operationally connect to the internal shaft conduit, and a piston positioned in the recess and configured to move axially relative to the shaft and to engage the clutch pack. The piston may be configured to move axially toward the clutch pack at an increase of the pressure of a hydraulic fluid in the recess. The recess being configured to operationally connect to the internal shaft conduit is understood to encompass the recess being in fluid communication with the internal shaft conduit.

The recess may be annular and concentric with the shaft, and the piston may be ring-shaped and concentric with the shaft.

The wet clutch may further comprise a mechanical seal between the piston and the front part configured to prevent the hydraulic fluid from passing, or escaping, between the piston and the front part. This way, the hydraulic fluid cannot escape the actuator other than through the one or more relief valves, or back through the internal shaft conduit.

The piston may comprise, or form, an outer piston surface facing outwards and an inner piston surface facing inwards. The recess may comprise, or form, an outer recess surface facing inwards and an inner recess surface facing outwards. The piston and recess surfaces may be concentric relative to, or rotationally symmetric with respect to, the shaft. It is understood that the outer piston surface faces the outer recess surface, and that inner piston surface faces the inner recess surface. The complete surfaces may face each other if the actuator is in an unengaged state.

The mechanical seal may comprise an annular outer gasket, such as a double-acting O-ring piston seal, configured to prevent the hydraulic fluid from passing between the outer piston surface and the outer recess surface. The piston, or the outer piston surface, may comprise, or form, an outer gasket recess. The outer gasket may be positioned in, or supported by, the outer gasket recess.

Similarly, the mechanical seal may comprise an annular inner gasket, such as a double-acting O-ring piston seal, configured to prevent the hydraulic fluid from passing between the inner piston surface and the inner recess surface. The recess of the front part, or the inner recess surface, may comprise, or form, an inner gasket recess. The inner gasket may be positioned in, or supported by, the inner gasket recess.

The outer piston surface may be bisected, or evenly divided, in a front portion and a rear portion, wherein the front portion is closer to the clutch pack than the rear portion. The front portion and the rear portion of the outer piston surface may have the same length parallel to the shaft, or in a direction parallel to the rotational axis of the shaft. They may be rotationally symmetric with respect to the shaft.

The outer gasket recess may be concentric relative to the shaft. The outer gasket recess may be position on, or form part of, the rear portion of the outer piston surface. The front portion of the outer piston surface may be cylindrical. The outer recess surface may be cylindrical.

The inner recess surface may be bisected in a front portion and a rear portion, wherein the front portion is closer to the clutch pack than the rear portion. The front portion and the rear portion of the inner recess surface may have the same length parallel to the shaft, or in a direction parallel to the rotational axis of the shaft. They may be rotationally symmetric with respect to the shaft.

The inner gasket recess may be concentric relative to the shaft. The inner gasket recess may be position on, or form part of, the front portion of the inner recess surface. The rear portion of the inner recess surface may be cylindrical. The inner piston surface may be cylindrical.

The piston may be mechanically biased, or spring biased, in a direction away from the clutch pack. It may be biased to disengage from the clutch pack, or in the direction of, or toward, the recess. The clutch pack may comprise a spring arrangement biasing the piston. Additionally, or alternatively, the wet clutch may comprise an annular pressure plate concentric with respect to the shaft and positioned between the actuator and the clutch pack. This means that it is positioned between the piston and the clutch pack. The pressure plate may contact the clutch pack and the piston of the actuator. The wet clutch may further comprise a plurality of springs individually positioned in, or supported by, the clutch hub, wherein each spring engages, or biases, the pressure plate. The pressure plate in turn biases the piston. The relative positioning results in a biasing of the piston in a direction away from the clutch pack.

The one or more relief valves may be positioned, or housed, in the piston. This means that no modifications of the front part are required with respect to the relief valve, which can therefore be made compact. In extension, this allows for a more compact wet clutch.

The wet clutch may comprise a plurality of relief valves. The relief valves may be positioned in a rotational symmetry relative to the shaft, or the rotational axis of the shaft. This has the effect that the hydraulic fluid will be released in a symmetrical manner, which will prevent an imbalanced caused by an uneven, or unbalanced, distribution of the hydraulic fluid in the wet clutch, or in the actuator. For example, the wet clutch may have two release valves positioned 180° apart with respect to the shaft, or the rotational axis of the shaft. This means that the relief valves are positioned on opposite sides of the shaft. In another example, the wet clutch may have three release valves positioned 120° apart with respect to the shaft, or it may have six release valves positioned 60° apart with respect to the shaft.

Each of the outlet release conduits may be formed by, or at least in part by, the pressure plate. For example, the outlet release conduit may comprise a groove or open channel in the pressure plate facing the actuator, or the piston, that extends to an outer edge of the pressure plate relative to the shaft. The outlet release conduit in the pressure plate may extend in a radial direction relative to the shaft.

Each of the outlet release conduits may be formed by, or at least in part by, the piston. For example, the outlet release conduit may comprise a groove or open channel in the piston facing the pressure plate, or the clutch pack, that extends to an outer edge of the piston relative to the shaft. Alternatively, or additionally, each of the outlet release conduits may be formed by, or at least in part by, the front part. For example, the outlet release conduit may comprise a groove or open channel in the front part facing the pressure plate, or the clutch pack, that extends to an outer edge of the front part relative to the shaft.

Each relief valve may comprise a valve seat and a valve member configured to cooperate with the valve seat. The valve member may be spherical.

The valve seat may separate the relief valve in an input side and an output side. The valve member may be configured to move relative to the valve seat in a direction that is transverse to shaft. The valve member may be configured to move radially, or perpendicular, relative to the shaft. Worded differently, the relief valve may be configured to move the valve member relative to the valve seat in a direction that is transverse to shaft. Here, the cooperation between the valve member and the valve seat is understood to encompass the opening and closing of the relief valve. The valve member may be configured to move linearly relative to the valve seat.

The relief valve may further comprise a valve body. It is understood that the valve member is located in the valve body. The valve body may be formed by the piston. Additionally, or alternatively, the valve seat may be formed by the piston. The piston may be monolithic or manufactured from a single piece of material.

The valve member may engage the valve seat in a closing movement toward the shaft and disengages the valve seat in an opening movement away from the shaft. Worded differently, the valve member may have a closed position relative to the valve seat and an open position relative to the valve seat. The valve member may be closer to the shaft in the closed position than in the open position. It is understood that in the closed position the valve member and the valve seat cooperate to prevent the hydraulic fluid from passing through the relief valve. It is further understood that in the open position valve member and the valve seat form a passage through which the hydraulic fluid can pass.

The valve seat may be positioned between the valve member and the shaft. It is understood that this positioning is in a radial direction relative to the shaft. The valve member engaging the valve seat may encompass the closing of the relief valve. The valve member disengaging the valve seat may encompass the opening of the relief valve.

The relief valve may have a closed state and an open state. It is understood that when the relief valve is in the closed state the hydraulic fluid is prevented from passing through the relief valve. It is further understood that when the relief valve is in the open state the hydraulic fluid can pass through the relief valve and that the relief valve can change between the closed state and the open state. The relief valve may be mechanically biased, or spring biased, to be in the closed state. The mechanical or spring biasing may be both in the closed state and in the open state.

The relief valve may comprise a valve spring. The valve member may be mechanically biased, or spring biased, toward the valve seat, for example by the valve spring. Worded differently, the valve member may be mechanically biased, or spring biased, to be in the closed position. The biasing may be toward the shaft, transversely to the shaft, or radially relative to the shaft. The valve spring may be a compression coil spring. The valve spring may bias the valve member toward the valve seat, or the valve member to be in the closed position, or the relief valve to be in the closed state.

The relief valve may be configured to reduce, or mitigate, the mechanical biasing, or spring biasing, of the relief valve at a rotation of the shaft, or at a rotation of the relief valve relative to the rotational axis of the shaft. The relief valve may be configured to be biased to change, or transition, from the closed state to the open state at a rotation of the shaft. The relief valve may be configured to change, or transition, from the closed state to the open state at a rotational speed of the shaft that is above 1000 rpm, 2000 rpm, 4000 rpm, 5000 rpm or 6000 rpm.

The relief valve may be configured to reduce, or mitigate, the mechanical biasing, or spring biasing, of the valve member toward the valve seat at a rotation of the shaft. The relief valve may be configured to bias, or rotationally bias, the valve member away from the valve seat at a rotation of the shaft, or at a rotation of the relief valve relative to the rotational axis of the shaft. Worded differently, the relief valve may be configured to bias, or rotationally bias, the valve member to change, or transition, from the closed position to the open position at a rotation of the shaft.

The relief valve may comprise a spring base support connected to the valve body. Here, it is understood that the valve spring engages the spring base support and the valve member, and that the valve spring is compressed, or biased, therebetween. The spring base support may have an adjustable position in a direction toward or away from the valve member, or toward or away from the valve seat. This way, the compression of the spring, and in extension the biasing of the valve member can, be adjusted. For example, the spring base support may comprise, or form, male threads and the valve body may form female threads cooperating with the male threads of the spring base support. the treading allows for the position of the spring base support relative to the valve body, and in extension to the valve member and the valve seat, to be adjusted.

The valve body may form a cylindrical spring bore, wherein the valve spring is positioned in and aligned with the cylindrical spring bore, The valve seat, or valve member, is then positioned at one end, or inner end, of the spring bore and the spring base support is positioned at the other end, or an outer end, of the spring bore. The cylindrical spring bore may form the female threads cooperating with the male threads of the spring base support.

The cylindrical spring bore may extend from the front portion of the outer piston surface, for example transversely toward to shaft. Additionally, or alternatively, the spring base support may be positioned at the front portion of the outer piston surface. This, in combination with the outer gasket recess being positioned on the rear portion of the outer piston surface, allows for a longer stroke of the piston, without an increase in the general diameter of front part, which would be the case if the outer gasket recess was positioned on the outer recess surface.

The spring base support may be configured for a manual adjustment, for example by a screwdriver or an Allen key.

The valve member may be biased away from the valve seat at a rotation of the wet clutch. Here, it is understood that the biasing is by the centripetal force resulting from the rotation. The biasing may be away from, or transversely away from, the shaft.

The relief valve may be configured to be biased in, or to maintain, the closed state by, or at, a static pressure in the hydraulic fluid at the relief valve. Here, it is understood that the relief valve is in the closed state. Worded differently, the relief valve may be configured to bias the valve member in, or maintain, the closed position by, or at, a static pressure in the hydraulic fluid at the relief valve.

The relief valve may be configured to be biased toward the closed state by, or at, a dynamic pressure in the hydraulic fluid at the relief valve. Here, it is understood that the relief valve is in the open state. The dynamic pressure is present only if there is a flow of hydraulic fluid through the relief valve. The relief valve may be configured to be biased to change, or transition, from the open state to the closed state at, or by, a flow of the hydraulic fluid through the relief valve. Here, it is understood that the flow of the hydraulic fluid is from the actuator. Worded differently, the relief valve may be configured to bias the valve member to change, or transition, from the open position to the closed position by, or at, a dynamic pressure in the hydraulic fluid at the relief valve, or at, or by, a flow of the hydraulic fluid through the relief valve.

The relief valve may be configured to change, or transition, from the closed state to the open state at a rotational speed of the shaft that is above 2000 rpm, 4000 rpm, 5000 rpm or 6000 rpm with hydraulic fluid present in the actuator.

The valve member may be positioned upstream of the valve seat with respect to a flow from the recess to the surroundings of the wet clutch. This means that dynamic pressure of the flow acts to close the valve if it is open, or to transition from the open state to the closed state. It also means that a static pressure, for example a pressure supplied for the activation of the clutch or a rotationally induced pressure, acts to close the valve.

The valve seat may separate the relief valve in an input side and an output side, wherein the input side is in fluid communication with the recess, the output side is in fluid communication with the surroundings of the wet clutch, and a flow of a hydraulic fluid from the input side to the output side, or a dynamic pressure of a hydraulic fluid in the actuator, may bias the valve member toward the valve seat. Here, it is understood that the relief valve is open, or the valve member being in an open position relative to the valve seat, at the flow of a hydraulic fluid from the input side to the output side.

Additionally, or alternatively, a hydraulic fluid, or a static pressure of a hydraulic fluid, on the input side may bias the valve member against the valve seat. This may be when the relief valve is open, or the valve member being in an open position relative to the valve seat, or when the relief valve is closed, or the valve member being in a closed position relative to, or engaging, the valve seat.

The one or more relief valves may be configured to restrict a flow of hydraulic fluid passing through the internal shaft conduit and the actuator. Here, it is understood that the restricting is relative to the internal shaft conduit and the actuator.

The internal shaft conduit, and/or the actuator, may have a first minimum area transverse to a flow of hydraulic fluid activating the actuator, and the one or more relief valves may have a total, or combined, second minimum area transverse to a flow of hydraulic fluid released through the one or more relief valves, wherein the second area is smaller than the first area. Here, it is understood that the valve member of each relief valve is in the open position relative to the valve seat. This has the effect that the flow of hydraulic fluid is restricted by the one or more relief valves.

The second minimum area may be defined by the separations between the valve seat and the valve member of the relief valves when they are fully open. It is understood that the first minimum area of the actuator refers to the actuator as a whole, which may include hydraulic couplings to the internal shaft conduit. It is not limited to the effective area of the piston or the cross-sectional area of the internal shaft conduit.

The first minimum area may be at least three times greater, five times greater, or ten times greater, than the second minimum area. For example, the first minimum area may be defined by the internal shaft conduit having a diameter of 4 mm, and there may be two relief valves, each having an inlet release conduit with a diameter of 1 mm that jointly defines the second minimum area.

The front part may be attached to the clutch hub. It may be fixed relative to the shaft by the clutch hub. The wet clutch may further comprise: a radially extending back part, or flange, configured to be, fixed relative to, or mounted on, the shaft. The back part may be juxtaposed to the clutch hub and the clutch pack may positioned between the back part and the front part, wherein the clutch pack is pressed against the back part when the clutch pack is engaged by the actuator. The back part may be attached to the clutch hub. It may be fixed relative to the shaft by the clutch hub.

The shaft may have an additional internal shaft conduit for a coolant. The wet clutch further comprises: a plurality of individual clutch conduits, wherein each clutch conduit has a front part portion, or collar portion, formed by the front part and a hub portion formed by the clutch hub. The front part portion has an inlet for receiving the coolant, and the hub portion is coupled to the front part portion and has one or more outlets at the clutch pack for releasing the coolant. The wet clutch further comprises: a plurality of valves, wherein each valve is operationally connected to a single clutch conduit configured to control the flow of coolant through the clutch conduit, and an actuator supported by the front part and configured to simultaneously engage the clutch pack and operate the plurality of valves.

The plurality of clutch conduits allows for a compact construction of the wet clutch. Additionally, the fact that the actuator engages the clutch pack and operates the plurality of valves means that it controls both the operation, or engagement and disengagement, and the cooling of the clutch pack. This joint function also allows for a more compact construction.

Here, the front part, or collar, may be ring-shaped. The clutch pack is understood to be a multiple-plate clutch pack having a plurality of stacked inner and outer plates, or a plurality of stacked driving and driven plates. The actuator may be a single actuator. This means that there is only one actuator, or that there is only a single piston that engages the clutch pack.

The clutch hub may be configured to be rigidly attached directly to the shaft, for example by way of splines. The front part may be rigidly attached to the clutch hub, for example by way of bolts. Alternatively, it may be rigidly attached directly to the shaft. This way, the clutch hub and the front part may be rotationally and axially, or lengthwise, fixed relative to the shaft. When the wet clutch is installed, the fact that the clutch hub and the front part are rotationally and axially fixed relative to the shaft means that they cannot rotate relative to the shaft and cannot shift lengthwise relative to the shaft. That the clutch basket is rotationally supported with respect to the shaft, means that it can rotate relative to the shaft, provided that it is not prevented from rotating by the clutch pack. The clutch basket may be axially fixed relative to the shaft, for example by way of a rolling bearing. This means that when the wet clutch is mounted on the shaft, it cannot shift axially with respect to the shaft and only the clutch basket and the parts of the clutch pack engaging the clutch basket can rotate relative to the shaft.

The clutch hub may be concentric with respect to the shaft. Similarly, the clutch basket may be concentric with respect to the shaft. When the wet clutch is mounted on the shaft, it is understood that the shaft extends through the complete clutch basket and the complete clutch hub. In other words, the wet clutch is configured to allow for the shaft to pass through, or extend along, its complete axial length. This means that the wet clutch forms a through-going hole for receiving the shaft.

The clutch hub may constitute a unitary body manufactured from a single piece of material. Similarly, the front part may constitute a unitary body manufactured from a single piece of material. The clutch hub may form a through hole for receiving the shaft. Similarly, the front part may form a through hole for receiving the shaft.

It is understood that the hydraulic fluid is a liquid. The coolant may be a liquid. The hydraulic fluid and the coolant may be the same liquid, or the same type of liquid, where the hydraulic fluid part is supplied through the internal shaft conduit and the coolant part is supplied through the additional internal shaft. The liquid may further be a lubricant or have the function of a lubricant in the wet-clutch or in external equipment, such as gears of a gearbox. The liquid may be oil-based.

The actuator may be configured to engage the clutch pack when activated. This means that the wet clutch must be actively engaged or locked. When the actuator is deactivated, the clutch pack, and in extension the wet clutch, is disengaged or open. The plurality of individual clutch conduits may comprise ten or more clutch conduits. The hub portion of each clutch conduit may be elongated and aligned with the shaft or extend parallel with the shaft. Each hub portion may have a cylindrical portion, which means that the portion is shaped like a cylinder. It may have a circular cross-section. The cylindrical portion may have an axis that is parallel to the shaft, or to the axis of the shaft. The cylindrical portions of all hub portions may have parallel cylinder axes. The features specified here enable a compact conduit arrangement, which in turn allows for a more compact wet clutch.

The front part may form a through hole for receiving the shaft. The through hole has a circumferential inner wall portion facing the shaft, the front part forms a circumferential groove, or channel, in the inner wall portion for receiving the coolant from the shaft conduit, and the inlet of the front part portion of each clutch conduit connects to the groove. For example, the shaft conduit may have a single outlet and when the wet clutch is installed, the circumferential groove may be located at and in fluid communication with the single outlet. The inner wall portion facing the shaft may be configured to be flush with the shaft and prevent coolant from leaking between the front part and the shaft.

The front part portions of the clutch conduits may be evenly distributed around the shaft. Similarly, the hub portions of the clutch conduits may be evenly distributed around the shaft. The distribution around the shaft is understood to be an angular distribution with respect to the rotational axis of the shaft. For example, if there are 12 front part portions, there is a 30-degree separation with respect to the rotational axis of the shaft between the centers of neighboring front part portions.

The plurality of clutch conduits and the groove may form part of, or constitute, a conduit arrangement configured to operationally connect the shaft conduit to the outlets and to allow a flow of coolant there between. The conduit arrangement then constitutes a manifold distributing the coolant.

Each clutch conduit, or hub portion, may have a plurality of outlets that are distributed axially with respect to the clutch hub. In extension, this means that outlets are distributed axially with respect to the shaft. Alternatively, each clutch conduit, or hub portion, may have a single outlet that is elongated and extends axially with respect to the clutch hub. This allows for an axial distribution of the coolant, which in turn allows for clutch packs with a greater number of plates and a reduced diameter, thus contributing to a more efficient and compact wet clutch.

The clutch hub and the clutch pack may form, or be connected by, a spline joint, wherein the spline joint comprises a plurality of axially extending ridges and grooves in the clutch hub. The one or more outlets of each clutch conduit may then be located at the bottom of a single groove. In an alternative wording, the spline joint may comprise a plurality of male splines in the clutch hub, and the one or more outlets of each clutch conduit may be located between two neighboring male splines. The number of ridges or male splines may be an integer multiple of the number of clutch conduits. For example, the number of clutch conduits may be fifteen and the number of male splines may be forty-five, corresponding to an integer multiple of three. The plurality of axially extending ridges and grooves may form a male spline cooperating with a female spline formed by the clutch pack.

The clutch pack may have: (a) an unengaged state in which the clutch hub and the clutch basket are unlocked and can spin at different speeds, (b) a slipping state in which the clutch hub and the clutch basket are partially locked together, or partially engaged by kinetic friction, and can spin at different speeds, and (c) an engaged state in which the clutch hub and the clutch basket are locked together, or fully engaged by static friction, and spin at the same speed. When the clutch hub and the clutch basket are unlocked, it is understood that no torque can be mechanically transferred there between. A torque transfer by a fluid coupling caused by the coolant is not considered a mechanical torque transfer in this context. That the clutch hub and the clutch basket are partially locked together means that there is a slipping mechanical coupling between the clutch hub and the clutch basket. The slipping state is understood to encompass a partly engaged state. The clutch hub and the clutch basket being locked together means that there is a non-slipping mechanical coupling between the clutch hub and the clutch basket.

The clutch pack may be concentric with respect to the clutch hub, and in extension with respect to the shaft. The clutch basket may be concentric with respect to the clutch pack, and in extension with respect to the clutch hub. The clutch pack may have an annular shape and extend both radially and axially with respect to the clutch hub, and in extension with respect to the shaft.

The clutch pack may comprise a plurality of inner plates attached, or connected, to the clutch hub and a plurality of outer plates attached, or connected, to the clutch basket. The inner plates can move axially relative to the clutch hub and are rotationally, or angularly, fixed relative to the clutch hub, and the outer plates can move axially relative to the clutch basket and are rotationally, or angularly, fixed relative to the clutch basket. This means that the clutch hub constitutes an inner plate carrier, and the clutch basket constitutes an outer plate carrier.

The inner and outer plates may be positioned alternately in the clutch pack. In the unengaged state there is no mechanical friction between the inner plates and the outer plates, in the slipping state there is a kinetic friction between the inner plates and the outer plates, and in the engaged state there is a static friction between the inner plates and the outer plates.

The actuator may be configured to compress the clutch pack axially. The clutch pack may change from the unengaged state (a) to the engaged state (c), via the slipping state (b), when it is compressed axially.

The clutch pack may form a plurality of channels that extends transversely, or radially, relative to the shaft and allows passage for the coolant between the inner and outer plates, or through the clutch pack, when the clutch pack is in its engaged state. The channels may be formed in the inner plates and define a square or rectangular grid pattern. The transversely extending channels contribute to an efficient cooling of the clutch pack.

The clutch hub may have a plurality of male splines and each of the plurality of inner plates may have a plurality of female splines cooperating with the plurality of male splines of the clutch hub. The clutch basket may have a plurality of female splines and each of the plurality of outer plates may have a plurality of male splines cooperating with the plurality of female splines of the clutch basket.

Each valve may: (i) prevent, or limit, the flow of coolant when the clutch pack is in its unengaged state, (ii) allow the flow of coolant when the clutch pack is in its slipping state, and allow the flow of coolant when the clutch pack is in its engaged state. The flow of coolant may be greater when the clutch pack is in its engaged state than when it is in its slipping state. For example, the flow in the slipping state may be in the range 70% to 100%, or 90% to 100% of the flow in the engaged state.

The abovementioned pressure plate may be configured to engage the clutch pack and form part of each valve.

For each valve, the front part may form a valve seat at the coupling, or connection, between the hub portion and the front part portion of the clutch conduit to which the valve is connected. The seat may be a hard seat that is integral with the front part. This means that there is no elastomer gasket providing the sealing. The pressure plate may be disk-shaped and/or have rotational symmetry with respect to the shaft. It may have a central hole and the pressure plate may have, or form, a plurality of protrusions, or lugs, each extending radially inwards in the central hole, or with respect to the central hole. Each protrusion of the pressure plate may constitute a valve member, or valve disc, of a single valve of the plurality of valves. The protrusion may contact, or seal against, the valve seat of the valve when the wet clutch is in its unengaged state. In its engaged state, the wet clutch may present a gap between the protrusion and the valve seat, thus allowing a flow of the lubricant past the protrusions and into the hub portions.

The pressure plate may form part of or be integral with the actuator. In the slipping state and in the engaged state, the clutch pack may be axially loaded by the pressure plate.

The wet clutch may further comprise a plurality of springs individually positioned in the hub portions of the plurality clutch conduit, wherein each spring engages, or biases, the pressure plate. This means that there is a spring in the hub portion of each clutch conduit. It is understood that the spring biases, or pushes, the pressure plate toward the actuator, or front part. This means that the piston in turn is mechanically biased, or spring biased, in a direction away from the clutch pack.

If the hub portions have cylindrical portions, the springs may be positioned in the cylindrical portions of the hub portions. Each spring may engage the protrusion of the pressure plate. Provided that the protrusions form parts of the valves, this means that the springs jointly act to close the valves. Each spring may be a compression coil spring and oriented to compress and extend parallel to the shaft.

The pressure plate, or the protrusion, may block the front part portions of the clutch conduits, when the clutch pack, or wet clutch, is in its unengaged state. This way, the coolant is prevented from flowing through the clutch conduits and reaching the clutch pack.

The actuator may comprise: an annular recess formed by the front part and concentric with the shaft, and a ring-shaped piston positioned in the recess and configured to move axially relative to the shaft.

The annular recess may face, or be open in the direction of, the clutch pack or the pressure plate. The ring-shaped piston may engage or contact the annular pressure plate. In the slipping state and in the engaged state, the ring-shaped piston axially loads, or presses against, the pressure plate. The plurality of springs may bias, or push, the pressure plate toward, or against, the ring-shaped piston.

The back part may be rigidly attached to the clutch hub, for example by way of bolts. Alternatively, it may be rigidly attached directly to the shaft. Either way, the clutch hub and the front part may be rotationally and axially fixed relative to the shaft. It is understood that the back part extends outwards with respect to, or transverse to, the shaft. The back part has the function of an abutment, or end plate, against which the clutch pack is pressed by the actuator. In the slipping state and in the engaged state, the clutch pack is then axially loaded by the pressure plate and the back part. The back part may be concentric with respect to the shaft. It may have an annular shape. The back part allows for a compact construction of the wet clutch.

The clutch basket may have a cylindrical shape, or it may be ring-shaped. This means that the clutch basket has a limited radial extent and that it does not form an end plate extending in the radial direction. The clutch basket comprises, or forms, a plurality of apertures for allowing the coolant to escape the wet clutch in the radial direction. This means that the wet clutch is not sealed and that the coolant is not contained in the wet clutch. Thus, no circulation system for the coolant is required within the wet clutch as such, which allows for a more compact construction. Instead, the coolant may be circulated by an external system. Additionally, this allows for the wet clutch to be free from coolant when the wet clutch, or clutch pack, is not engaged. Additionally, or alternatively, there may be a gap between the clutch basket and the front part through which the coolant can escape the wet clutch.

In a second aspect of the proposed technology, a gear assembly is provided for mounting on a shaft having an internal shaft conduit for a hydraulic fluid. The gear assembly comprises: a gear wheel configured to be rotationally supported with respect to shaft, and a wet clutch according to the first aspect of the proposed technology. The wet clutch is configured to be mounted on the shaft and operationally connect to the internal shaft conduit. The clutch basket of the wet clutch is attached to the gear wheel. The shaft may pass through the complete gear assembly. The shaft may have an additional internal shaft conduit for a coolant and the wet clutch may be configured to operationally connect to the additional internal shaft conduit.

Operationally connected to the internal shaft conduit is here understood to encompass the actuator being coupled to, or in fluid communication, with the internal shaft conduit, such that it can receive a hydraulic fluid therefrom. Operationally connected to the additional internal shaft conduit is here understood to encompass the inlet of the front part portion of each individual clutch conduit of the wet clutch being coupled to, or in fluid communication with, the additional internal shaft conduit, such that it can receive a coolant therefrom. It is understood that the clutch basket is rotationally fixed relative to the gear wheel.

The gear assembly may further comprise: a radial spacer configured to be rotationally fixed relative to the shaft, and a radial rolling bearing having an inner race attached to the radial spacer and an outer race attached to the gear wheel. The radial spacer may be configured to attach to the shaft. Alternatively, the radial spacer may be attached to the clutch hub. It may be fixed relative to the shaft by the clutch hub.

The gear wheel and the wet clutch may be concentric with respect to the shaft. It is understood that the term "gear wheel" does not encompass sprockets, or sprocket-wheels, commonly used for meshing with chains, belts, or the like. The gear wheel may have a maximum radius that is two to seven times greater than the width at maximum radius. The maximum radius is understood as the radius of the outer circle defined by the apexes of the cogs or teeth of the cog wheel, and the width may be the width at the cogs or teeth.

The gear wheel may have, or form, an axially extending flange concentric with the shaft, wherein the clutch basket and the flange overlap. The clutch basket is attached to the flange. The clutch basket and the flange may have conforming shapes at the overlap. The outer side of the flange may conform to the inner side of the clutch basket at the overlap.

The gear assembly as a whole may form a through hole for receiving the shaft. It is understood that the gear wheel has a central through bore, or hole, with a cylindrical inner wall, and that the outer race may conform to, or be attached to, the inner wall of the through bore. The radial spacer may have a ring-shaped hollow body. The body may be hollow or partly hollowed. The radial spacer may be attached to, or mounted on, the clutch hub. The clutch hub in turn may be configured to be mounted on and rigidly attached directly to the shaft, as explained above. This way, the radial spacer is configured to be rotationally fixed relative to the shaft.

The mass $m_{valve}$ of the valve member in each relief valve may satisfy the relationship:

$$m_{valve} > (F_{valve,bias} + (A_{valve}/A_{piston})*F_{piston,bias})/(r_{valve}*\omega_{engage}^2), \text{ where}$$

$F_{valve, bias}$ is the force generated by the valve spring biasing the valve member, $A_{valve}$ is the effective area of the valve member, $A_{piston}$ is the effective area of the piston, $F_{piston, bias}$ is the force biasing the piston in the unengaged state, for example by the abovementioned plurality of springs, $r_{valve}$ is the radial position of the relief valve, or valve member in the closed position, relative to the rotational axis of the shaft, $\omega_{engage}$ is the angular velocity of the shaft at which the piston engages the clutch pack, or the at which the wet clutch is activated, by a rotationally induced pressure in the hydraulic fluid. Here, the effective area is understood as a measure corresponding to the force divided by the pressure inducing the force.

In a third aspect of the proposed technology, a shaft assembly is provided that comprises: a shaft having an internal shaft conduit for a hydraulic fluid, and a gear assembly according to the second aspect of the proposed technology, wherein the gear assembly is mounted on the shaft and operationally connected to the internal shaft conduit. The shaft may have an additional internal shaft conduit for a coolant and the gear assembly, or the actuator of the wet clutch, may be configured to operationally connect to the additional internal shaft conduit.

In a fourth aspect of the proposed technology, a gearbox assembly for a road vehicle is provided. The gearbox assembly comprises a gearbox and hydraulic control system, wherein the gearbox comprises: a gearbox case, a shaft assembly according to the third aspect of the proposed technology, wherein the gear assembly of the shaft assembly is positioned inside the gearbox case. The gearbox further comprises an oil sump configured to collect hydraulic fluid released from the wet clutch of the gear assembly. The hydraulic control system comprises: a hydraulic pump operationally connected to the oil sump and to the internal shaft conduit.

The oil sump may form part of the gearbox case. That the hydraulic pump may be operationally connected to the oil sump and the internal shaft conduit of the shaft. The hydraulic pump may be configured to receive hydraulic fluid, or liquid, collected by the oil sump and supplying pressurized hydraulic fluid to internal shaft conduit. The hydraulic control system may further comprise one or more control valves configured to regulate a flow of the hydraulic fluid from the hydraulic pump to the internal shaft conduit, and in extension to the wet clutch.

Further, the oil sump may be configured to collect coolant released from the wet clutch of the gear assembly. It is understood that the hydraulic fluid and the coolant are mixed in the oil sump. The gearbox assembly may further comprise a coolant regeneration pump operationally connected to the oil sump and to the additional internal shaft conduit of the shaft. The regeneration pump may be configured to receive coolant, or liquid, collected by the oil sump and supply coolant to the additional internal shaft conduit. This way, the liquid collected in the oil sump can be regenerated and resupplied to the wet clutch.

When the relief valve is open and the pressure is increased in the internal shaft conduit to activate the actuator, the hydraulic fluid will start to flow through the release valve causing a dynamic pressure acting on the valve member, which causes the relief valve to close.

BRIEF DESCRIPTION OF THE DRAWINGS

A more complete understanding of the abovementioned and other features and advantages of the proposed technology will be apparent from the following detailed description of preferred embodiments of the proposed technology in conjunction with the appended drawings, wherein.

DETAILED DESCRIPTION OF THE DRAWINGS

Figure 1A:
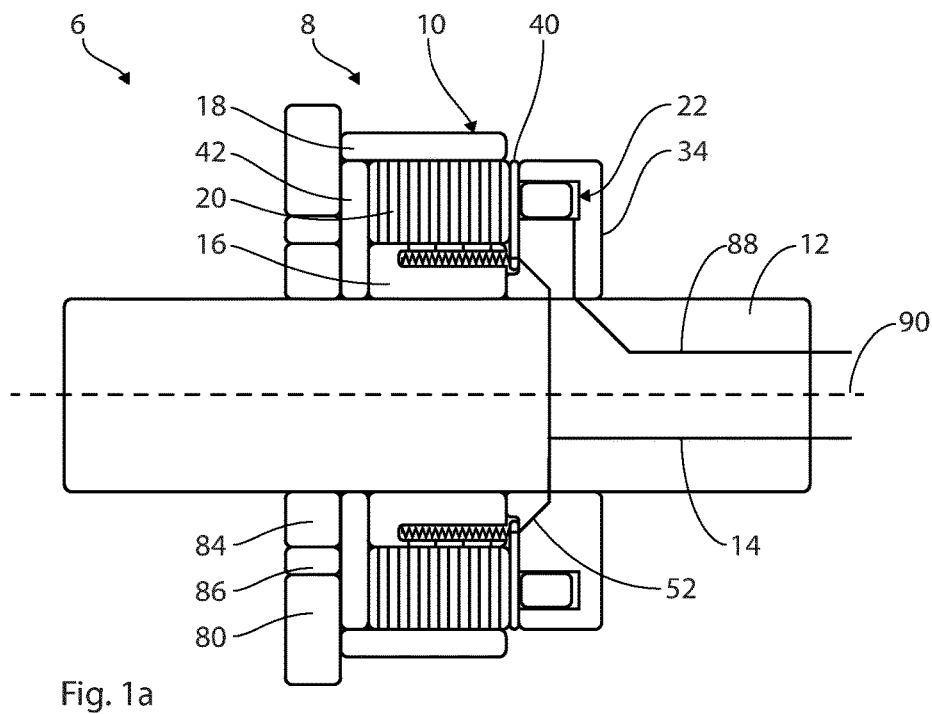
FIG. 1a is a schematic cross section pf an embodiment of shaft assembly.
Figure 1B:
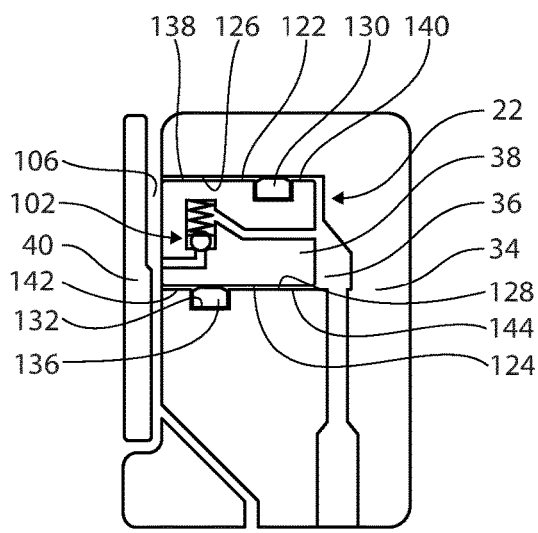
FIG. 1b is a schematic cross section of a front part with a piston fitted with a relief valve.
Figure 2:
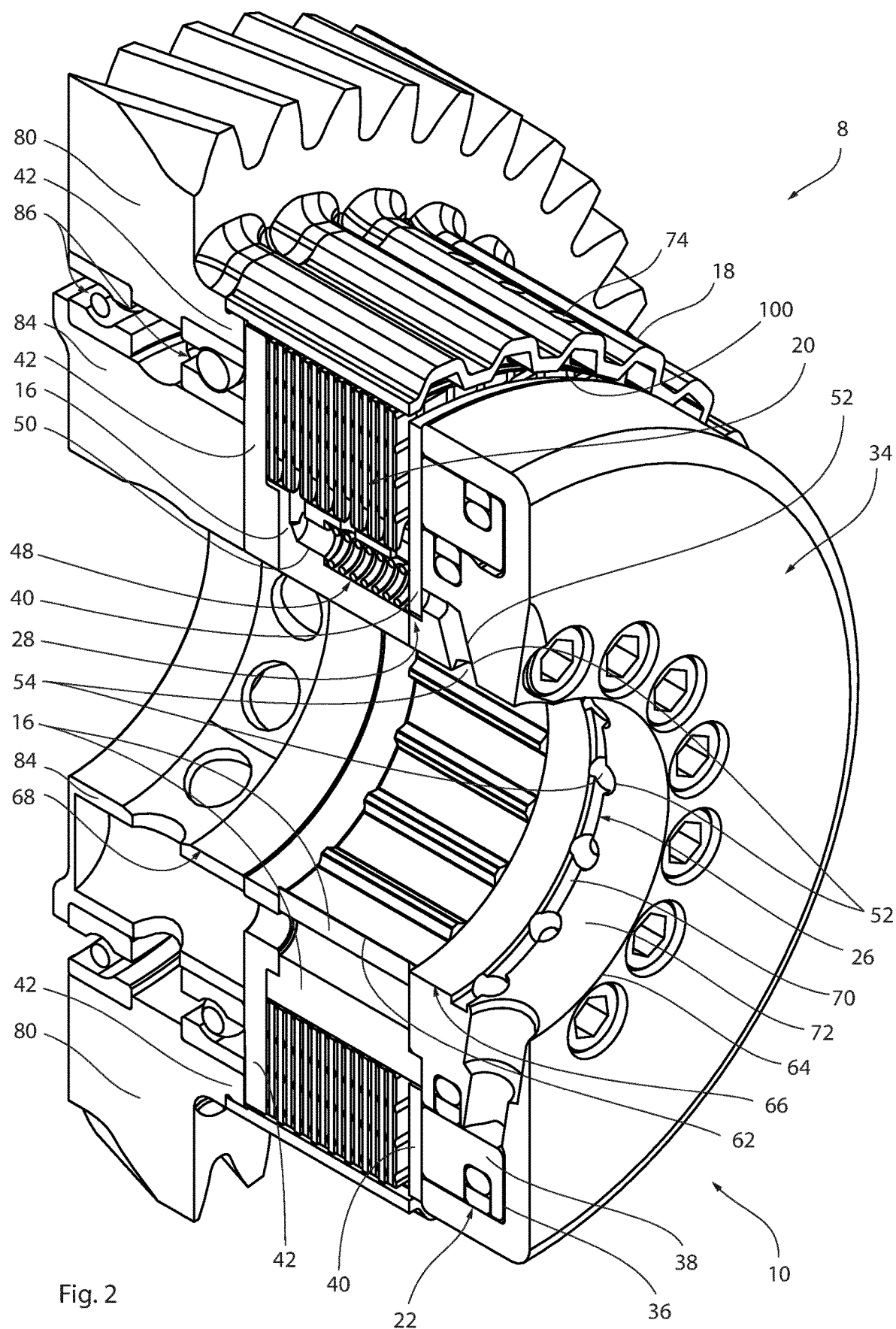
FIG. 2 illustrates a perspective cross-section of an embodiment of a gear assembly shown in FIG. 1.
Figure 3:
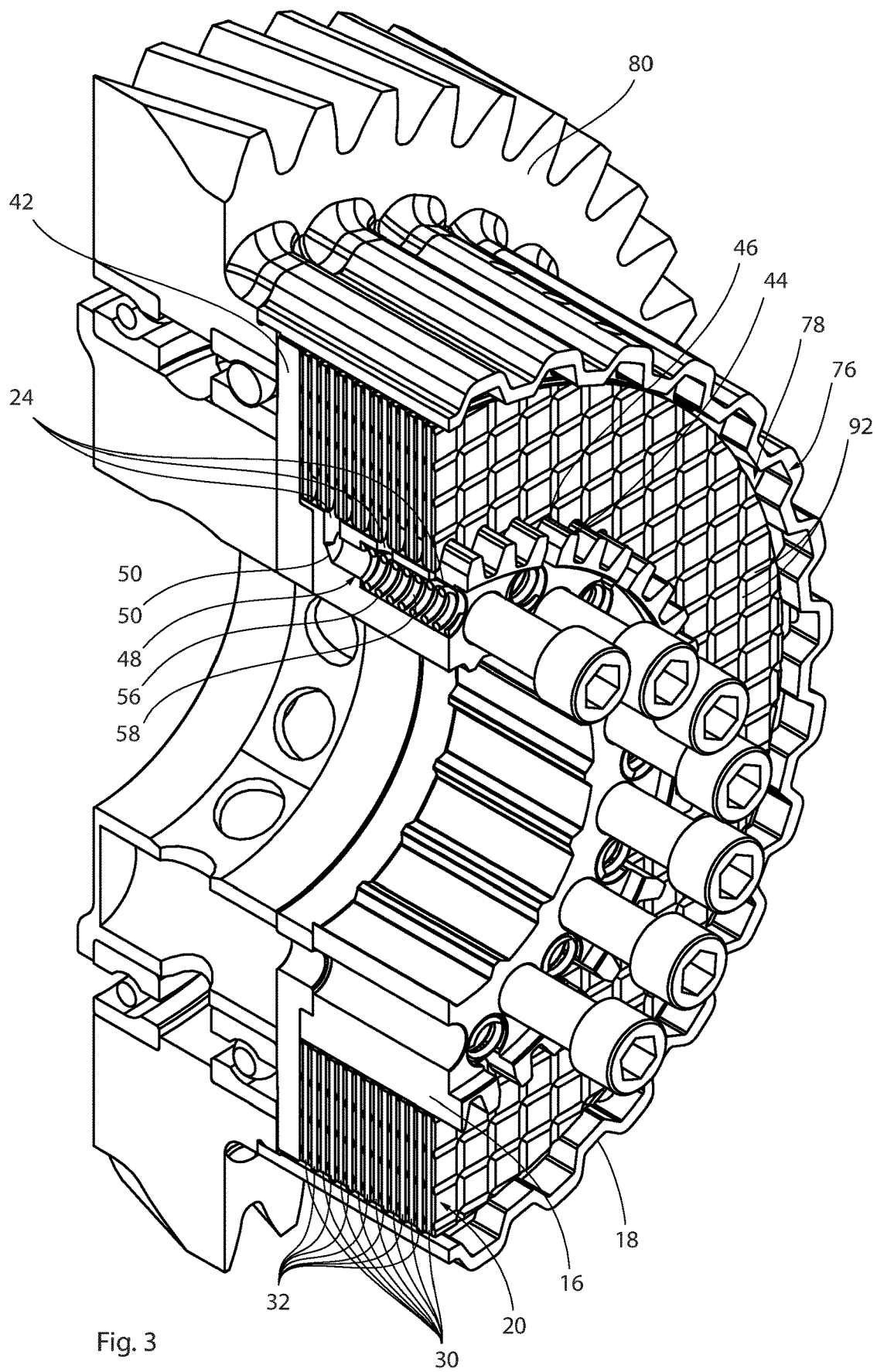
FIG. 3 illustrates a perspective cross-section of a part of the gear assembly shown in FIG. 2.
Figure 4:
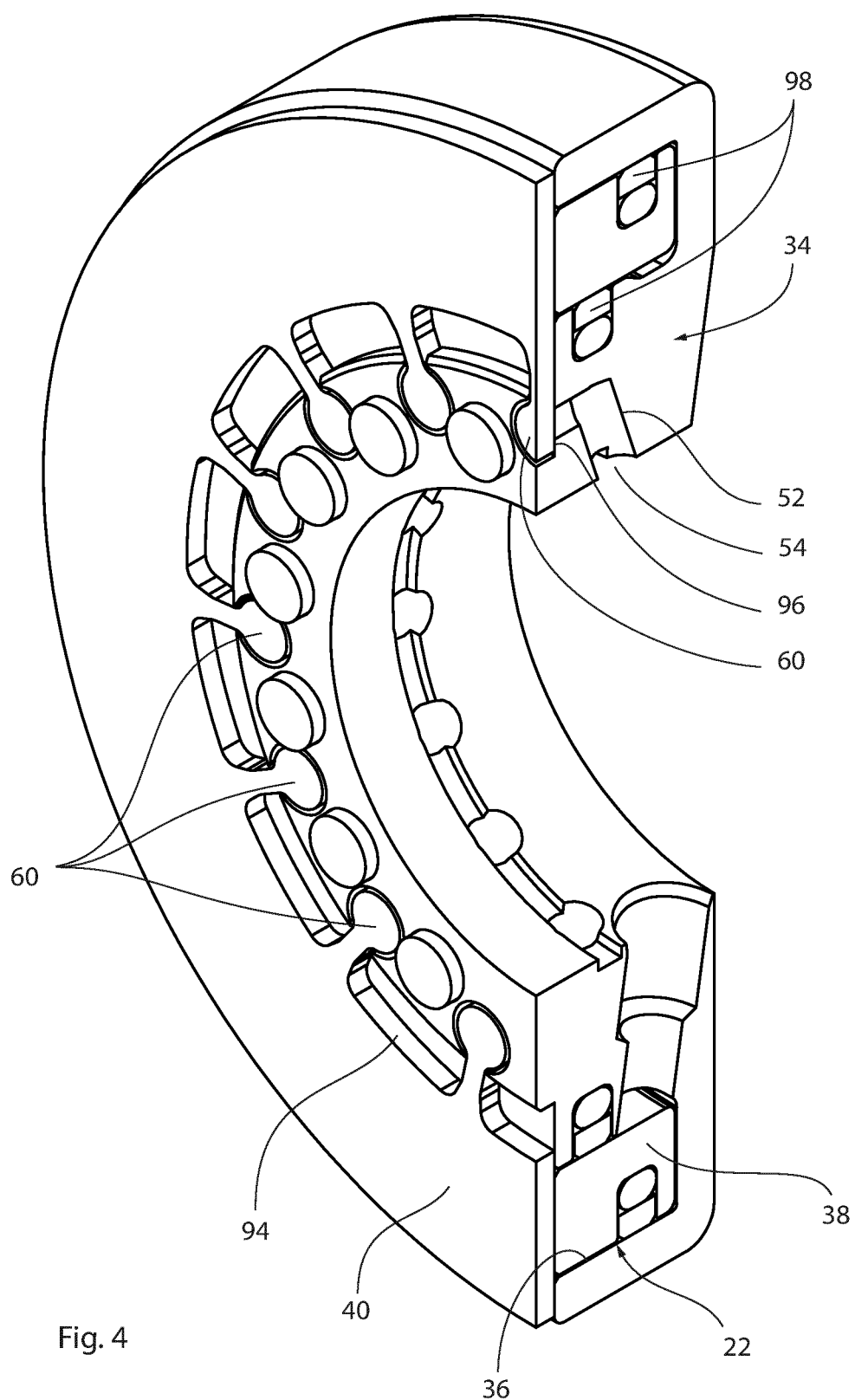
FIG. 4 illustrates a perspective cross-section of another part of the gear assembly shown in FIG. 2, FIG. 5 schematically illustrates an embodiment of a gearbox including the shaft assembly shown in FIG. 1, and FIG. 6 schematically illustrates an alternative embodiment of a piston and a relief valve.

FIG. 1a schematically illustrates a shaft assembly 6 that has a shaft 12 with an internal shaft conduit 88 for a hydraulic fluid and an additional internal shaft conduit 14 intended for carrying a combined coolant and lubricant. It also has a gear assembly 8 that is mounted on the shaft 12 and connected to the additional internal shaft conduit 14. The gear assembly 8 as a whole forms a through hole 68 receiving the shaft 12, whereby the shaft 12 passes through the complete gear assembly 8. The gear assembly 8 has a gear wheel 80 that is rotationally supported with respect to shaft 12. It also has a wet clutch 10 that is mounted on the shaft 12 and operationally connected to the additional internal shaft conduit 14. Details of the wet clutch 10 are shown in FIGS. 2-4.

The gear wheel 80 and the wet clutch 10 are concentric with respect to the shaft 12. The gear wheel 80 has an axially extending flange 82 that is also concentric with the shaft 12. The clutch basket 18 and the flange 82 overlap at the flange 82. The outer side of the flange 82 conforms to the inner side of the clutch basket 18 at the overlap, whereby the clutch basket 18 is attached to the flange 82, and in extension to the gear wheel 80.

The wet clutch 10 is a multi-plate clutch and the shaft 12 passes through the complete wet clutch 10. The wet clutch 10 has a clutch hub 16 that is mounted on the shaft 12 and radially fixed relative to the shaft 12 by way of splines. It further has a clutch basket 18 that is rotationally supported relative to shaft 12 and a clutch pack 20 that connects the clutch hub 16 and the clutch basket 18. The wet clutch 10 also has a front part 34 that is juxtaposed and attached to the clutch hub 16 by way of bolts. This way, the front part 34 is mounted on and rotationally fixed relative to the shaft 12.

The clutch hub 16 and the clutch basket 18 are concentric with respect to the shaft 12. The clutch hub 16 forms a through hole 62 and the front part 34 forms another through hole 64. This means that the clutch hub 10 as a whole forms a through hole 66 that receives the shaft 12.

The gear assembly 8 has a radial spacer 84 that is rotationally fixed relative to the clutch hub 16 by way of bolts. Thus, it is also rotationally fixed relative to the shaft 12. The gear assembly 8 further has a radial rolling bearing 86 with an inner race attached to the radial spacer 84 and an outer race attached to the gear wheel 80. The gear wheel 80 has a central through bore with a cylindrical inner wall, and the outer race conforms to and engages the inner wall of the through bore. The radial spacer 84 has a ring-shaped partly hollow body.

Clamps (not shown) are positioned on the shaft 12 on either side of the gear assembly 8 that axially fix the wet clutch 10, and in extension the clutch hub 16, the clutch basket 18, and the front part 34, relative to the shaft 12.

The clutch hub 16 has been manufactured from a single piece of material. Similarly, the front part 34 has been manufactured from a single piece of material. This means that both components individually constitute a unitary body.

The wet clutch 10 has a number of individual clutch conduits 48, more precisely 15 clutch conduits 48. Each has a front part portion 52 formed by the front part 34 and a hub portion 50 formed by the clutch hub 16. The front part portion 52 has an inlet 54 that can receive the coolant. The hub portion 50 is coupled to the front part portion 52 and has three outlets 24 at the clutch pack 20 through which the coolant can be released. The outlets 24 are distributed axially with respect to the clutch hub 16, which means that they are distributed lengthwise with respect to the shaft 12.

The hub portion 50 of each clutch conduit 48 is elongated and aligned with the shaft 12. Each hub portion 50 has a cylindrical portion 56 with a circular cross-section and an axis that is parallel to the axis 90 of the shaft 12, as can be seen in FIG. 3. This means that all cylindrical portions 56 have parallel cylinder axes.

The through hole 64 of the front part 34 that receives the shaft 12 has a circumferential inner wall portion 72 facing the shaft 12. The front part 34 forms a circumferential groove 70 in the inner wall portion 72 that can receive the coolant from the additional internal shaft conduit 14, and the inlet 54 of the front part portion 52 of each clutch conduit 48 connects to the groove 70. The inner wall portion 72 facing the shaft 12 is flush with the outer surface of the shaft 12. This way, the individual clutch conduits 48 form part of a conduit arrangement 26 that connects the additional internal shaft conduit 14 to the outlets 24. The conduit arrangement 26 allows a flow of coolant from the additional internal shaft conduit 14 to be distributed at the clutch pack 20, thus having the function of a manifold.

The front part portions 52 and the hub portions 50 of the clutch conduits 48 are evenly distributed around the shaft 12. They have a 24-degree separation with respect to the rotational axis 90 of the shaft 12 between neighboring clutch conduits 48.

The clutch hub 16 has a number of axially extending ridges 44 that form part of a spline joint with the clutch pack 20. The outlets 24 of each clutch conduit 48 are located between a pair of neighboring ridges 44, or more precisely at the bottom of the single groove between neighboring ridges 44. There are forty-five ridges 44 and fifteen clutch conduits 48, which means that there are three times more of the former than the latter. The axially extending ridges 44 form male splines 44 cooperating with female splines 46 formed by the clutch pack 20.

The clutch pack 20 has three states. In the first state, or the unengaged state, the clutch hub 16 and the clutch basket 18 are unlocked and can spin at different speeds. In extension, this means that the gear wheel 80 can spin freely relative to the shaft 12. In the second state, or the slipping state, the clutch hub 16 and the clutch basket 18 are partly locked together but can spin at different speeds. This means that some torque is transferred from the shaft 12 to the gearwheel 80. In the third state, or the engaged state, the clutch hub 16 and the clutch basket 18 are locked together and spin at the same speed. This means that all torque supplied to the shaft 12 is transferred to the gear wheel 80.

The wet clutch 10 has 15 valves 28. Each valve 28 controls the flow of coolant through a single clutch conduit 48. The wet clutch 10 further has a single actuator 22 supported by the front part 34 and an annular pressure plate 40 that is concentric with respect to the shaft 12, as is shown in FIGS. 1a and 2. The pressure plate 40 is positioned between the actuator 22 and the clutch pack 20 such that it can engage the clutch pack 20 when the actuator 22 is activated. Additionally, the pressure plate 40 forms part of each valve 28, which means that it simultaneously engages the clutch pack 20 and operates the valves 28.

When activated, the actuator compresses the clutch pack 20 axially and the clutch pack 20 changes from the unengaged state to the engaged state via the slipping state.

The clutch pack 20 is concentric with respect to the clutch hub 16 and the shaft 12. The clutch basket 18 is concentric with respect to the clutch pack 20, and in extension with respect to the clutch hub 16. The clutch pack 20 has an annular shape and extends both radially and axially with respect to the axis of the shaft 90.

The clutch pack 20 has eight inner plates 30 attached to the clutch hub 16, which constitutes an inner plate carrier, and seven interleaved outer plates 32 attached to the clutch basket 18, which constitutes an outer plate carrier. The inner plates 30 can move axially relative to the clutch hub 16 and are rotationally fixed relative to the clutch hub 16. Similarly, the outer plates 32 can move axially relative to the clutch basket 18 and are rotationally fixed relative to the clutch basket 18.

The inner and outer plates 30 and 32 are positioned alternately in the clutch pack 20. In the unengaged state there is no mechanical friction between the inner plates 30 and the outer plates 32, in the slipping state there is a kinetic friction between the inner plates 30 and the outer plates 32, and in the engaged state there is a static friction between the inner plates 30 and the outer plates 32.

The clutch pack 20 forms channels 92 in a square grid pattern on both sides of each inner plate 30. Even though not radially oriented, the square grid on the circular plate 30 mean that all the channels 92 to some extent extend radially with respect to the shaft 12, which enables the coolant to flow radially outwards through the clutch pack 20.

As mentioned above, the clutch hub 16 has a number of outer male splines 44 and each inner plate 30 has the same number female splines 46 that cooperated with the male splines 44. Similarly, the clutch basket 18 has female splines 76 and each of the outer plates 32 has male splines 78 cooperating with the female splines 76.

The valves 28 have been constructed to prevent the flow of coolant through the clutch conduits 48 when the clutch pack 20 is in its unengaged state. It further allows the flow of coolant when the clutch pack 20 is in its slipping state and its engaged state. In some embodiments, the flow of coolant is up to ten times greater when the clutch pack 20 is in its engaged state than in its unengaged state, this means that there is a flow of coolant even if the valves 28 are in the closed state.

The front part 34 forms a valve seat 96 at each coupling between the hub portions 50 and the front part portions 52 of the clutch conduits 48. The valve seat 96 is a hard seat integral to the front part 34.

The pressure plate 40 is disc-shaped, planar, and has a rotational symmetry with respect to the axis 90 of the shaft 12. It has a central through hole 94 and forms a number of protrusions 60, more precisely 15 protrusions 60, each extending radially inwards in the central hole 94 as illustrated in FIG. 4. Each protrusion 60 constitutes a valve member, or valve disc, of a single valve 28 and seals against one of the valve seats 96 when the wet clutch 10 is in its unengaged state. In its engaged state, the pressure plate 40 is pushed by the actuator 22 such that a gap is formed between the protrusion 60 and the valve seats 96, thus allowing a flow of the coolant past the protrusions 60 and into the hub portions 50, from where it is expelled via the outlets 24.

A compression coil spring 58 is positioned in the cylindrical portion 56 of each hub portion 50. Each spring 58 engages a single protrusion 60 of the pressure plate 40, and the springs 58 jointly bias the pressure plate 40 with respect to the clutch hub 16 and pushes the pressure plate toward the actuator 22, thus acting to close the valves 28.

A valve is closed when the clutch pack 20, or wet clutch 10, is in its unengaged state, at which the protrusions 60 block the front part portions 52 of the clutch conduits 48. This way, the coolant is prevented from flowing through the clutch conduits 48 and reaching the clutch pack 20.

The actuator 22 has an annular recess 36 formed by the front part 34 and concentric with the axis 90 of the shaft 12. The recess 36 is connected to and in fluid communication with the internal shaft conduit 88. It further has a ring-shaped piston 38 concentric with the shaft 12 positioned in the recess 36 and that can move axially relative to the shaft 12 at an increase of the pressure of a hydraulic fluid in the recess 36. The annular recess 36 is connected to the additional internal shaft conduit 88. The actuator 22 is activated by increasing the pressure of the hydraulic fluid, which causes the ring-shaped piston 38 to move toward the clutch pack 20 and engage the wet clutch 10.

The ring-shaped piston 38 engages the annular pressure plate 40. In the slipping state and in the engaged state, the piston 38 presses against and axially loads the pressure plate 40. The plurality of springs 58 provides a counter force pushing the pressure plate 40 against the ring-shaped piston 38. By way of the pressure plate 40, the actuator 22 is configured to simultaneously engage the clutch pack 20 and operate the plurality of valves 28.

The wet clutch 10 has three relief valves 102 that are positioned 120° apart relative to the shaft 12. The valves 102 are positioned in the piston 38. Only one of the relief valves is shown in the schematic cross section of the shaft assembly 6 of FIG. 1a. The other two relief valves are identical in form and function. This means that the valve 10 has a plurality of relief valves that are positioned in a rotationally symmetric manner with respect to the rotational axis 90 of the shaft 12.

Each relief valve 102 has a valve body 108 and a valve seat 110, the latter separating the relief valve 102 in an input side 112 and an output side 114. The input side 112 is in fluid communication with the recess 36 and the output side 114 is in fluid communication with the surroundings of the wet clutch 10. The valve body 108 and the valve seat 110 are formed by the piston 38. The relief valve 102 further has a valve member 116 that is a spherical steel ball located inside the valve body 108. This means that a flow of a hydraulic fluid from the input side 112 to the output side 114, or a dynamic pressure of a hydraulic fluid, biases the valve member 116 toward the valve seat 110 if the relief valve 102 is open. Additionally, a static pressure in the input side 112 biases the valve member 116 toward the valve seat 110 if the relief valve 102 is closed.

The valve seat 110 is positioned between the valve member 116 and the shaft 12. The valve member 116 is mechanically biased toward the valve seat 110 by a compression coil spring 118. The valve spring 118 biases the valve member 116 toward the shaft 12 at a right angle to the rotation axis 90. This means that the valve member 116 engages the valve seat 110 in a closing movement toward the shaft 12 and disengages the valve seat 110 in an opening movement away from the shaft 12.

Figure 1C:
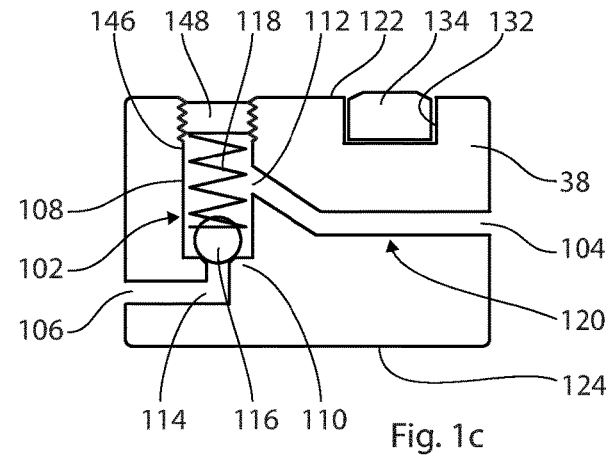
FIG. 1c is a schematic cross section of a piston with a relief valve with a valve member in the closed position.
Figure 1D:
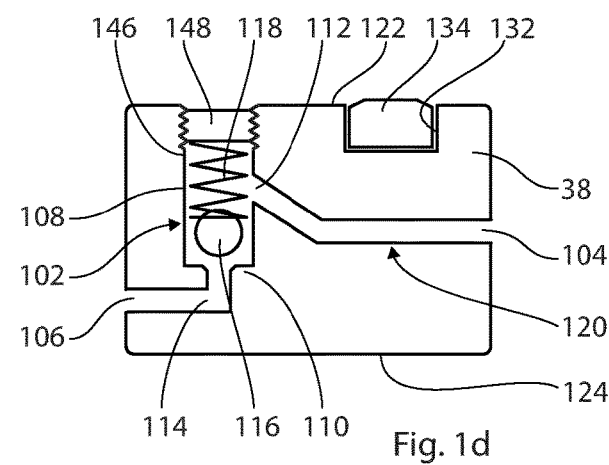
FIG. 1d is a schematic cross section of a piston with a relief valve with a valve member in the open position.

When the wet clutch 10 is rotated, the rotationally induced centripetal force will force the valve member 116 outwards. This force will be counteracted by the force from the valve spring 118 and by the rotationally induced pressure of the hydraulic fluid on the input side 112 of the relief valve 102. At some rotational speed, the centripetal force will overcome the counteracting forces, and the valve member 116 will move away from the valve seat 110 and the relief valve 102 opens to release the hydraulic fluid. This way, the relief valve is configured to release hydraulic fluid depending on the rotational speed of the shaft 12. A closed relief valve 102 is shown in FIG. 1c and an open relief valve 102 is shown in FIG. 1d.

The wet clutch 10 has an inlet release conduit 104 for the hydraulic fluid formed by a bore in the piston 38. The inlet release conduit 104 connects the actuator 22 and the relief valve 102. The wet clutch 10 further has an outlet release conduit 106 for the hydraulic fluid formed in part by a bore in the piston 38 and an open channel facing the piston 38 in the pressure plate 40. The outlet release conduit 106 connects the relief valve 102 to the surroundings of the wet clutch 10. The portion of the outlet release conduit 106 in the pressure plate 40 releases the hydraulic fluid at the outer edge of the pressure plate 40. This way, the relief valve 102, and in extension the wet clutch 10, is configured to release the hydraulic fluid in the actuator 22 to the surroundings of the wet clutch 10, thereby deactivating the actuator 22 if the actuator 22 is activated.

The actuator 22 is radially spaced apart from the shaft 12 and is connected to the shaft conduit 88, which means that a rotation of the shaft 12 builds up a pressure in the actuator 22. In a basic model of the function of the wet clutch 10, it is assumed that no pressure is actively generated and supplied through the internal shaft conduit 88 for activating the wet clutch 10. It is further assumed that $P_{rot}$ is the static pressure acting on the piston 38 that is generated from the radial column of hydraulic fluid when the wet clutch 10 is rotated. If $F_{piston,\,bias}$ is the force generated by the springs 58 biasing the piston 38 in the unengaged state, and $A_{piston}$ is the effective area of the piston, then the piston 38 engages clutch pack 20 if:

$$F_{piston,bias} < A_{piston} * P_{rot}, \text{ or } P_{rot} > F_{piston,bias}/A_{piston}.$$

The pressure of the hydraulic fluid in the actuator 22 must overcome the biasing of the springs 58 for the actuator to engage the clutch pack, by changing the actuator 22 from an unengaged to an engaged state.

If $F_{valve,\,rotation}$ is the centripetal force acting on the valve member 116 at the rotation of the wet clutch 10, $F_{valve,\,bias}$ is the force generated by the valve spring 118 biasing the valve member 116, and $A_{valve}$ is the effective area of the valve member 116, then the relief valve 102 is opened if:

$$F_{valve,rotation} > F_{valve,bias} + A_{valve} * P_{rot}.$$

In a simple model, the centripetal force $F_{valve,\,rotation}$ is given by:

$$F_{valve,rotation} = m_{valve} * r_{valve} * \omega^2,$$

where $m_{valve}$ is the mass of the valve member 116 and the valve spring 118, $r_{valve}$ the radial position of the relief valve 102 relative to the rotational axis 90 of the shaft 12, and $\omega$ is the angular velocity at which the shaft 12 rotates. If the valve should always be open at a rotational activation of the wet clutch, then:

$$F_{valve,rotation} > F_{valve,bias} + (A_{valve}/A_{piston}) * F_{piston,bias}.$$

The relief valve 102 can be configured to open before the hydraulic fluid reaches a pressure that activates the wet clutch 10 by increasing the centripetal force $F_{valve,\,rotation}$. This can be done my increasing the weight of the valve member 116, for example by using a heavier material, or by placing relief valve 102 at a greater distance from the rotational axis 90 of the shaft 12. The earlier opening can also be achieved by reducing the total biasing force $F_{piston,\,bias}$ of the springs 58, or by reducing the biasing force $F_{valve,\,bias}$ of the valve spring 118. Alternatively, it could also be achieved by reducing the effective area $A_{valve}$ of the valve member 116.

In the present embodiment, the wet clutch 10 is activated at a rotational speed of about 6400 rpm, and the relief valve 102 is configured to open at a rotational speed of about 4200 rpm. This way, the relief valve 102 is configured to release the hydraulic fluid above a first rotationally induced pressure that is below the pressure at which the hydraulic fluid causes the actuator 22 to engage the clutch pack 20. Additionally, the relief valve 102 is configured to release hydraulic fluid above a first rotational speed of the of the shaft 12, e.g. resulting in the first rotationally induced pressure.

When the relief valve 102 is open and the pressure is increased in the internal shaft conduit 88 to activate the actuator 22, the hydraulic fluid will start to flow through the release valve 102, resulting in a dynamic pressure acting on the valve member 116, which causes the relief valve 102 to close.

The piston 38 forms an outer piston surface 122 facing outwards and an inner piston surface 124 facing inwards. The recess 36 forms an outer recess surface 126 facing inwards and an inner recess surface 128 facing outwards. The four surfaces are concentric and rotationally symmetric with respect to the shaft 12. The outer piston surface 122 faces the outer recess surface 126 and that inner piston surface 124 faces the inner recess surface 128 when the actuator 22 is unengaged.

The wet clutch 12 has a mechanical seal between the piston 38 and the front part 34 configured to prevent the hydraulic fluid from passing, or escaping, between the piston 38 and the front part 34. This way, the hydraulic fluid cannot escape the actuator 22 other than through the one or more relief valves 102.

The piston 38 has an outer gasket recess 130 in the outer piston surface 122 and the recess 36 has an inner gasket recess 132 in the inner recess surface 128. An outer gasket 134 is positioned in and supported by the outer gasket recess 130, and an inner gasket 136 is positioned in and supported by the inner gasket recess 132. The outer gasket 134 prevents the hydraulic fluid from passing on the outside of the piston 38 between the outer piston surface 122 and the outer recess surface 126, and the inner gasket 136 prevents the hydraulic fluid from passing on the inside of the piston 38 between the inner piston surface 124 and the inner recess surface 128, thus jointly forming a mechanical seal between the piston 38 and the front part 34 that prevents hydraulic fluid from passing there between.

The outer piston surface 122 is bisected in a front portion 138 and a rear portion 140 of equal lengths parallel to the rotational axis 90 of the shaft 12. The front portion 138 is closer to the clutch pack 22 than the rear portion 140. The outer gasket recess 130 is position on the rear portion 140 of the outer piston surface 122.

The inner recess surface 128 is bisected in a front portion 142 and a rear portion 144 of equal length parallel to the rotational axis 90 of the shaft 12. The front portion 142 is closer to the clutch pack 22 than the rear portion 144 The inner gasket recess 132 is position on the front portion 142 of the inner recess surface 128.

The annular pressure plate 40 is mechanically biased by the springs 58 in a direction away from the clutch pack 20 and toward the recess 36. The pressure plate 40 in turn biases the piston 38. In extension, this means that the piston 38 is biased by the springs to rest in the recess 36.

The valve body 108, or piston 38, form a cylindrical spring bore 146 that starts at the front portion 138 of the outer piston surface 122 and extends inwards toward to shaft 12. The valve spring 118 is positioned in and aligned with the cylindrical spring bore 146. The valve seat 110 is positioned at the inner end of the spring bore 146 and a spring base support 148 is positioned at the outer end of the spring bore 146. The valve spring 118 is biased between the spring base support 148 and the valve member 116. The cylindrical spring bore 146 has a female threading at its outer end and the spring base support 148 has a cooperating male threading. The spring base support 148 can be engaged and turned by an Allen key, whereby the positioned of the spring base support 148 in the spring bore 146, and in extension the length and tension of the valve spring 118, can be manually adjusted if the piston 38 is free from the recess 36.

The internal shaft conduit 88 of the shaft defines the smallest, or minimum, transverse area of about 13 mm$^2$ upstream of the relief valve 102, which is understood to include the actuator 22. This corresponds to an internal shaft conduit 88 having a diameter of about 4 mm. The three relief valves 102 may have a combined smallest, or minimum transverse area of about 9 mm$^2$ that is defined by the combined areas of inlet release conduits 104, which corresponds to diameter of 1 mm of each release conduit 104. This means that the three relief valves 102 are configured to restrict the flow of hydraulic fluid that is released, and that the pressure in the actuator 22 can be increased to the point where it is activated, even if the relief valves 102 are open.

The valve member 116 has a diameter of 2 mm, while the cylindrical spring bore has a diameter of 2.3 mm.

The wet clutch 10 further has a radially and outwardly extending back part 42 mounted on and concentric with the shaft 12. The back part 42 is juxtaposed to the clutch hub 16 and the clutch pack 20 is positioned between the back part 42 and the front part 34. The back part 42 is attached to the clutch hub 16 by way of bolts. The clutch pack 20 is pressed against the back part 42 when the clutch pack 20 is engaged by the actuator 22 in the slipping state and in the engaged state of the wet clutch 10.

The clutch basket 18 has a cylindrical shape without endplates, as can be seen in FIG. 3. It has several apertures 74 through which the coolant can escape the wet clutch 10 radially with respect to the axis 90 of the shaft 12. There is also a gap between the clutch basket 18 and the front part 34 through which the coolant can escape the wet clutch 10.

Figure 5:
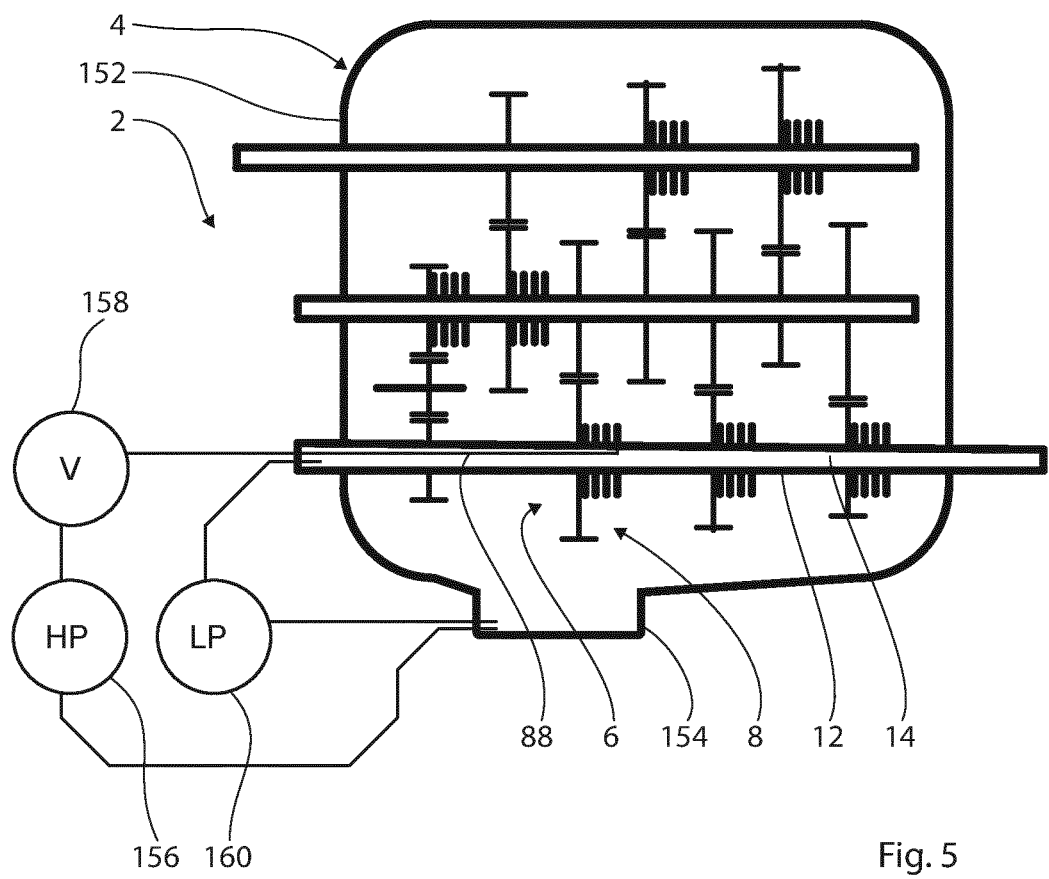

FIG. 5 schematically illustrates a gearbox assembly 2 including a gearbox 4 and a hydraulic control system 150. The gearbox 4 is intended to be used in a road vehicle and has a shaft assembly 6 as described above. The shaft 12 of the shaft assembly 6 is the input shaft of the gearbox 4 intended to receive torque from an internal combustion engine (not shown). The gearbox further has a gearbox case 152 in which the wet clutch 10 of the shaft assembly 6 is positioned. The gearbox 4 has an oil sump 154 forming part of the gearbox case 152 that collects hydraulic fluid and coolant released from the wet clutch 10 of the gear assembly 8. The hydraulic fluid and the coolant are mixed in the oil sump 154. This means that there is only one type of liquid inside the gearbox case 152, and that the difference in terminology reflects its different uses.

The hydraulic control system 150 has a high-pressure hydraulic pump 156 and a control valve 158 connected in series between the oil sump 154 and to the internal shaft conduit 88. The hydraulic pump 156 receives the liquid collected by the oil sump 154 and supplies it as hydraulic fluid to the internal shaft conduit 88, which in turn supplies the hydraulic fluid to the actuator 22 of the wet clutch 10. The control valve 158 controls and regulates the flow of the hydraulic fluid from the hydraulic pump 156 to the internal shaft conduit 88, and in extension to the wet clutch 10. The engagement and disengagement of the wet clutch 10 is controlled by the control valve 158.

The gearbox assembly 2 further has a low-pressure coolant regeneration pump 160 connected to the oil sump 154 and to the additional internal shaft conduit 14 of the shaft 12. The regeneration pump 160 receives the liquid collected by the oil sump 154 and supplies it as coolant to the additional internal shaft conduit 14.

Figure 6:
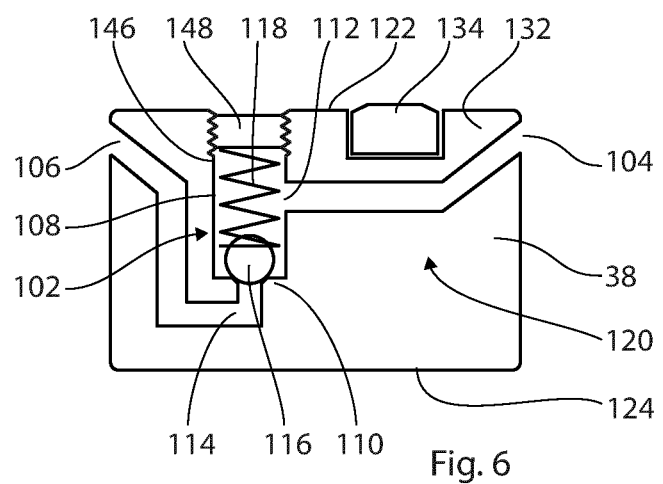

FIG. 6 schematically illustrates an alternative embodiment of a piston 38 and a relief valve 102 in which the inlet release conduit 104 has an inlet at the outer end of the piston 38 and the outlet release conduit 106 has an outlet at the outer end of the piston 38. The outer end of the piston is on a radially distant portion of the piston 38 with respect to the shaft 12, as is shown in FIG. 6.

ITEM LIST 2 gearbox assembly
4 gearbox
6 shaft assembly
8 gear assembly
10 wet clutch
12 shaft
14 additional internal shaft conduit for coolant
16 clutch hub
18 clutch basket
20 clutch pack
22 actuator
24 outlets
26 conduit arrangement
28 valve
30 inner plates
32 outer plates
34 front part or collar
36 ring-shaped recess
38 ring-shaped piston
40 pressure plate
42 back part or flange
44 male spline of clutch hub
46 female spline of inner plates
48 clutch conduit
50 hub portion of individual clutch conduits
52 collar portion of individual clutch conduits
54 inlet of clutch conduit
56 cylindrical portion
58 spring
60 protrusions of pressure plate
62 through hole of clutch hub
64 through hole of collar
66 through hole of wet clutch
68 through hole of gear assembly
70 circumferential groove of collar
72 inner wall portion of through hole of collar
74 apertures of clutch basket
76 female splines of clutch basket
78 male splines of outer plates
80 gear wheel
82 axially extending flange of gear wheel
84 radial spacer
86 rolling bearing
88 internal shaft conduit for hydraulic fluid
90 axis of shaft
92 channels of inner plates
94 through hole of pressure plate
96 valve seat
98 gaskets
100 gap
102 relief valve
104 inlet release conduit
106 outlet release conduit
108 valve body of relief valve
110 valve seat of relief valve
112 input side of relief valve
114 output side of relief valve
116 valve member of relief valve
118 biasing valve spring of relief valve
120 valve conduit
122 outer piston surface
124 inner piston surface
126 outer recess surface
128 inner recess surface
130 outer gasket recess
132 inner gasket recess
134 outer gasket
136 inner gasket
138 front portion of outer piston surface
140 rear portion of outer piston surface
142 front portion of inner recess surface
144 rear portion of inner recess surface
146 spring bore
148 spring base support 150 hydraulic control system
152 gearbox case
154 oil sump
156 hydraulic pump
158 control valve
160 low-pressure coolant regeneration pump

The invention claimed is:

1. A wet clutch for mounting on a shaft having an internal shaft conduit for a hydraulic fluid, wherein the wet clutch comprises:
   a clutch hub configured to be mounted on the shaft;
   a clutch basket configured to be rotationally supported relative to the shaft;
   a clutch pack operatively connecting the clutch hub and the clutch basket;
   a front part configured to be fixed relative to the shaft;
   an actuator supported by the front part and radially spaced apart from the shaft, wherein the actuator is configured to receive hydraulic fluid from the shaft conduit; and
   one or more relief valves connected to the actuator and configured to release the hydraulic fluid, wherein each relief valve has a closed state and an open state, each relief valve being spring-biased to be in the closed state, each relief valve being configured to reduce the spring biasing of the relief valve at a defined rotational speed of the shaft;
   wherein each of the one or more relief valves is configured to release the hydraulic fluid above a first rotationally induced pressure in the hydraulic fluid, and wherein the first rotationally induced pressure is below a pressure at which the hydraulic fluid causes the actuator to engage the clutch pack.

2. The wet clutch according to claim 1, wherein each relief valve comprises a valve seat and a valve member configured to cooperate with the valve seat, the valve member having a closed position relative to the valve seat and an open position relative to the valve seat, and wherein the valve member is spring biased to be in the closed position.

3. The wet clutch according to claim 2, wherein the valve member is configured to move relative to the valve seat in a direction that is transverse to shaft.

4. The wet clutch according to claim 2, wherein the valve seat is positioned between the valve member and the shaft.

5. The wet clutch according to claim 2, wherein each relief valve comprises a valve spring biasing the valve member to be in the closed position.

6. The wet clutch according to claim 1, wherein each of the one or more relief valves is configured to release the hydraulic fluid to a space surrounding the wet clutch.

7. The wet clutch according to claim 1, wherein the actuator comprises:
   a recess formed by the front part and configured to operationally connect to the internal shaft conduit; and
   a piston positioned in the recess and configured to move axially relative to the shaft and to engage the clutch pack;
   wherein the recess is annular and concentric with the shaft, and the piston is ring-shaped and concentric with the shaft.

8. The wet clutch according to claim 7, wherein each relief valve is positioned in the piston.

9. The wet clutch according to claim 7, wherein each relief valve comprises a valve body that is defined within the piston.

10. The wet clutch according to claim 9, wherein the valve member engages the valve seat in a closing movement toward the shaft and disengages the valve seat in an opening movement away from the shaft.

11. A wet clutch for mounting on a shaft having an internal shaft conduit for a hydraulic fluid, wherein the wet clutch comprises:
    a clutch hub configured to be mounted on the shaft;
    a clutch basket configured to be rotationally supported relative to shaft;
    a clutch pack operatively connecting the clutch hub and the clutch basket;
    a front part configured to be fixed relative to the shaft;
    an actuator supported by the front part and radially spaced apart from the shaft, wherein the actuator is configured to receive hydraulic fluid from the internal shaft conduit, wherein the actuator comprises a recess formed by the front part and operatively connected to the internal shaft conduit, and a piston positioned in the recess and configured to move axially relative to the shaft and to engage the clutch pack; and
    one or more relief valves connected to the actuator and configured to release the hydraulic fluid to prevent a rotationally-induced activation of the actuator;
    wherein the one or more relief valves are housed in the piston, each of the relief valves comprising a valve seat and a spherical valve member configured to cooperate with the valve seat, each of the valve seats being defined within the piston and positioned between the valve member and the shaft, and wherein each of the valve members is biased away from the valve seat in response to a rotation of the wet clutch.

12. The wet clutch according to claim 11, further comprising one or more inlet release conduits, each of the inlet release conduits being configured to lead the hydraulic fluid from the actuator to a relief valve of the one or more relief valves, wherein each of the inlet release conduits is formed by the piston.

13. The wet clutch according to claim 11, further comprising one or more outlet release conduits, each of the outlet release conduits being configured to lead the hydraulic fluid from a relief valve of the one or more relief valves to a space surrounding the wet clutch, and each of the outlet release conduits being formed at least in part by the piston.

14. The wet clutch according to claim 13, further comprising an annular pressure plate concentric with respect to the shaft and positioned between the actuator and the clutch pack, wherein each of the outlet release conduits is formed at least in part by the pressure plate.

15. The wet clutch according to claim 11, wherein the wet clutch comprises a plurality of the relief valves positioned in a rotational symmetry relative to the shaft.

16. The wet clutch according to claim 11, wherein, in each of the relief valves, the valve member engages the valve seat in a closing movement toward the shaft and disengages the valve seat in an opening movement away from the shaft.

17. The wet clutch according to claim 11, wherein, in each of the relief valves, the valve member is configured to move relative to the valve seat in a direction that is transverse to shaft.

18. The wet clutch according to claim 17, wherein, in each of the relief valves, the valve member is configured to move linearly relative to the valve seat.

19. The wet clutch according to claim 11, wherein each of the relief valves has a closed state and an open state, and each of the relief valves is configured to be biased to maintain the closed state at a static pressure in the hydraulic fluid at the relief valve.

20. The wet clutch according to claim 19, wherein each of the relief valves is configured to be biased toward the closed state at a dynamic pressure in the hydraulic fluid at the relief valve.

\* \* \* \* \*